Figure 1:
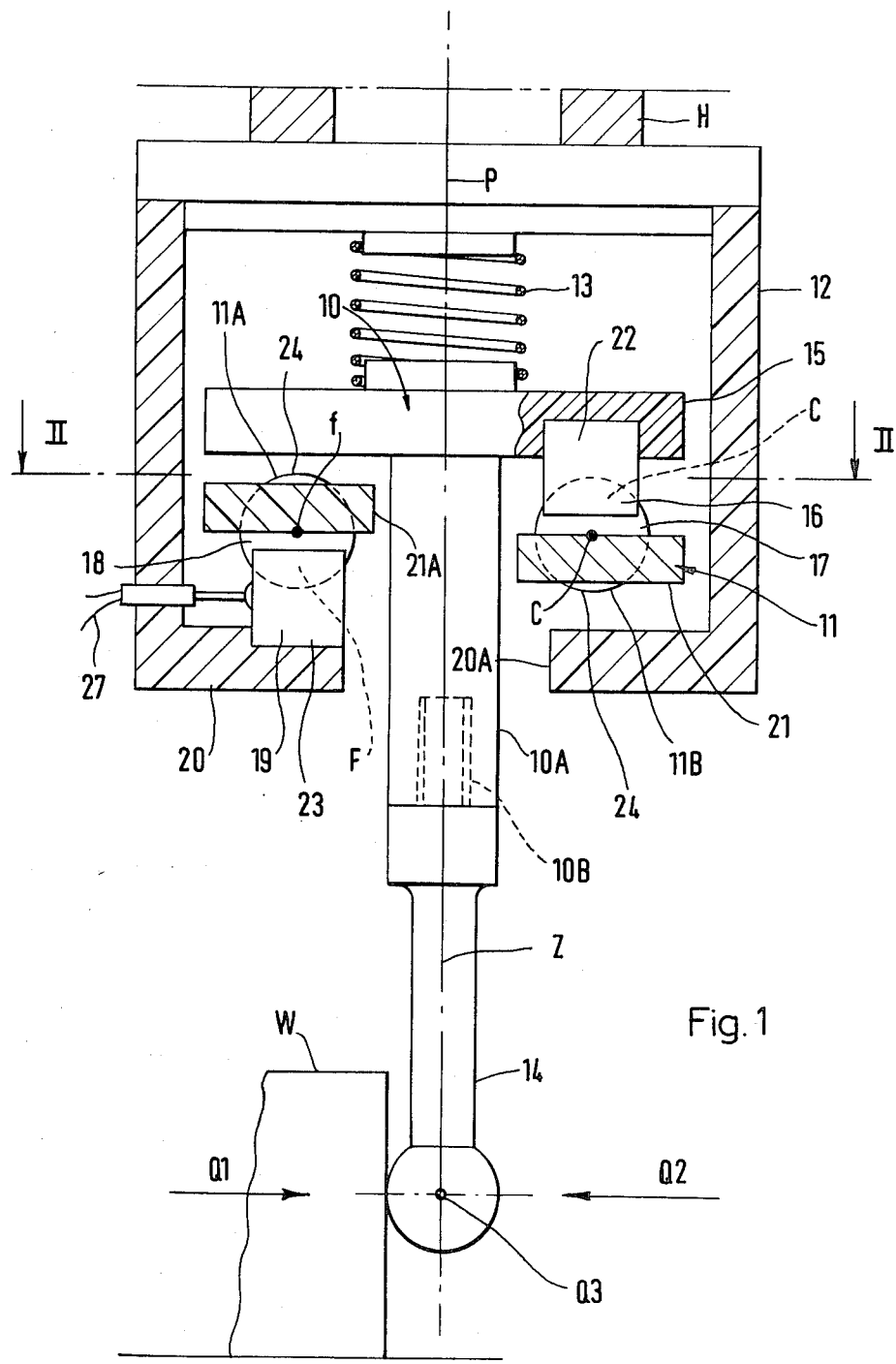

United States Patent [19]

McMurtry

[11] 4,138,823
[45] Feb. 13, 1979

[54] PROBE FOR USE IN MEASURING APPARATUS

[75] Inventor: David R. McMurtry, Wotton-under-Edge, United Kingdom

[73] Assignees: Rolls-Royce Limited, London; Renishaw Electrical Limited, Gloucestershire, both of England

[21] Appl. No.: 868,382

[22] Filed: Jan. 10, 1978

[30] Foreign Application Priority Data

Jan. 20, 1977 [GB] United Kingdom ............... 02255/77

[51] Int. Cl.² .............................................. G01B 7/02
[52] U.S. Cl. ................................ 33/174 L; 33/174 PC
[58] Field of Search ................ 33/23 H, 23 K, 169 R, 33/169 C, 172 R, 172 D, 172 E, 172 B, 174 R, 174 L, 174 P, 174 PC; 90/62 R; 82/14 B

[56] References Cited

U.S. PATENT DOCUMENTS

| | | | |
|---|---|---|---|
| 3,122,970 | 3/1964 | Rhoades | 33/23 K |
| 3,250,012 | 5/1966 | Hilton et al. | 33/172 E |
| 3,362,076 | 1/1968 | Bailey | 33/169 C |
| 3,766,653 | 10/1973 | McKay, Sr. | 33/174 L |

FOREIGN PATENT DOCUMENTS 1184972  1/1965  Fed. Rep. of Germany ......... 33/172 B
1445977  8/1976  United Kingdom ................. 33/174 L

OTHER PUBLICATIONS

Savage, "Multi-directional Probe", Apr. 1967, pp. 7 and 8.

Primary Examiner—Richard R. Stearns
Attorney, Agent, or Firm—Stevens, Davis, Miller & Mosher

[57] ABSTRACT

A probe for use in measuring machines comprises a stylus holder tiltably supported on three first seats arranged about an axis and on one side of an intermediate member. The intermediate member is tiltably supported at its other side on three second seats provided on a housing on the same pitch circle as the first seats but intermediate between the first seats. The stylus holder is therefore supported with the stability inherent in a three-point support but is tiltable about any two adjacent ones of six seats thereby improving the sensitivity of the probes.

8 Claims, 3 Drawing Figures

PROBE FOR USE IN MEASURING APPARATUS

This invention relates to probes for use in measuring apparatus which is of the kind comprising a head supported for movement relative to a work piece to be measured. The measuring operation typically comprises moving the head until a stylus connected to the head engages the work piece, and recording the position of the head in relation to a datum at the time of such engagement.

The probe is a device for supporting the stylus on the head of the machine. A known such probe comprises a movable member or stylus holder biased into a position in which it is supported on a fixed member at three spaced apart seats. When a stylus secured to the stylus holder is displaced, the stylus holder tilts either about one or about two of said seats depending on the direction of the displacing force. These different modes of tilting give rise to corresponding differences in the sensitivity of the probe because the force necessary to tilt the stylus holder about the one seat can be as much as twice that necessary for tilting about the two seats. It is an object of this invention to overcome or reduce this difficulty.

According to this invention there is provided a probe for use in measuring apparatus of the kind described, comprising a first, a second and a third member all arranged on a common axis, first seats provided on the second member at one axial side thereof and spaced around said axis, the first member being engageable with said first seats, second seats provided on the third member in positions such that there is one second seat situated angularly between each adjacent two first seats, the other side of said second member being engageable with said second seats, spring means for biasing the first member into engagement with said first seats and biasing the second member into engagement with said second seats, said first member constituting a holder for a stylus and being tiltable in opposition to said spring means about any adjacent two of said first seats and, through the intermediary of said second member, about any adjacent two of said second seats.

Preferably there are only three said first and three said second seats. Thereby the intrinsic stability of a three seat support is available for the stylus holder while at the same time there are six seats about which the holder can tilt. This results in a corresponding improvement in the sensitivity of the probe.

Figure 2:
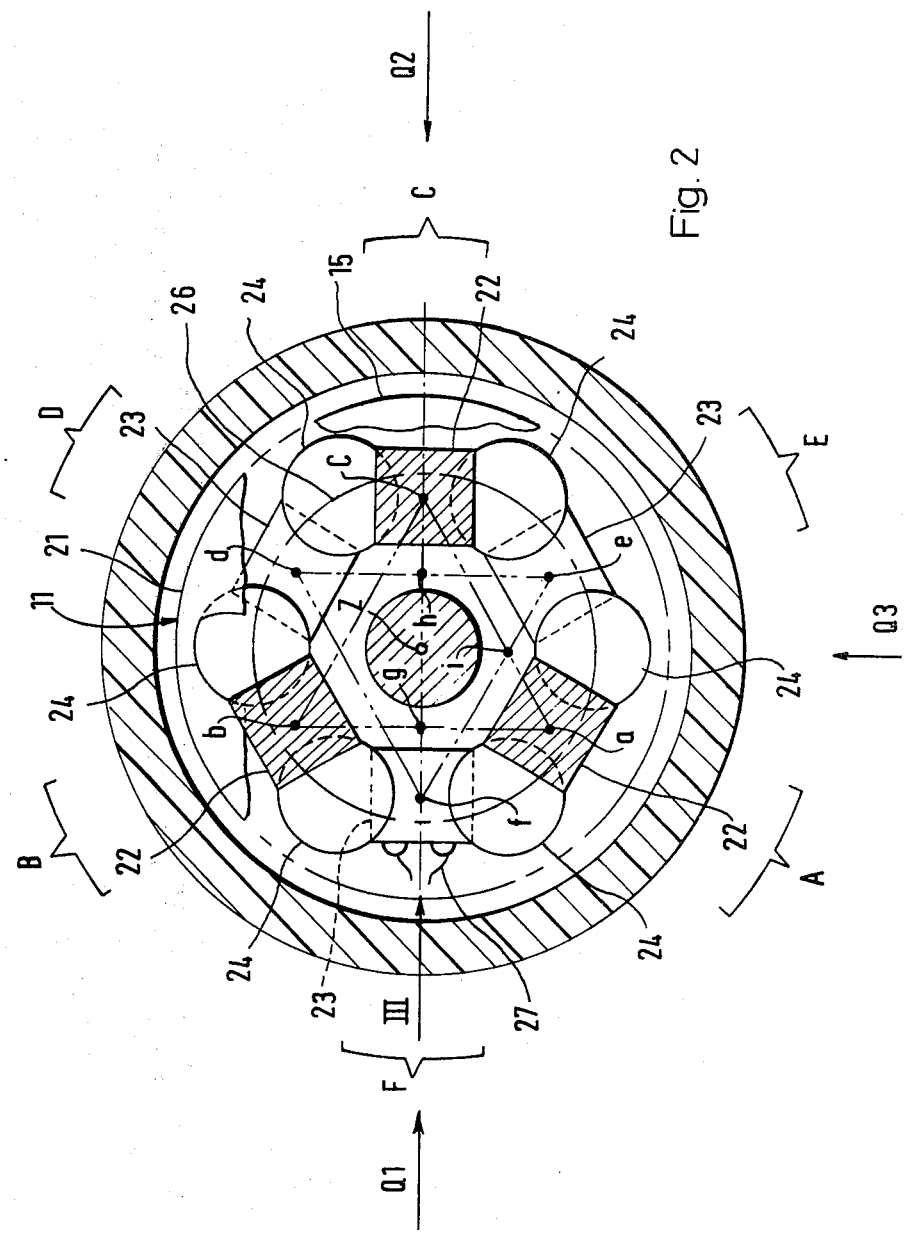
Figure 3:
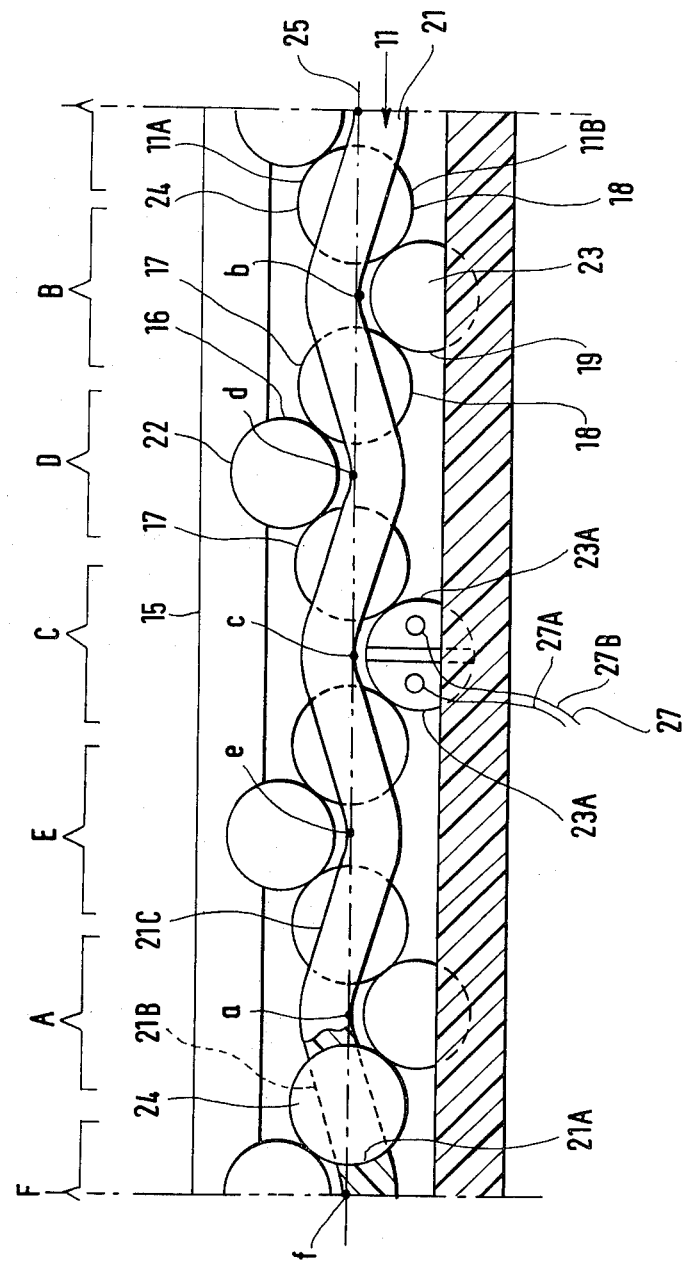

An example of a probe according to this invention will now be described with reference to the accompanying drawings wherein:

FIG. 1 is a sectional elevation of the probe,
FIG. 2 is a section on the line II—II in FIG. 1, and
FIG. 3 is a developed view on the line III in FIG. 2.

Referring to the drawings the probe comprises a first member or stylus holder 10, a second or intermediate member 11, and a third member or housing 12, all arranged on a common axis Z. The holder 10 is engageable with one axial side 11A of the intermediate member 11 at a set of three first seats A, B, C. The intermediate member is engageable at the other axial side 11B with the housing 12 at a set of three second seats D, E, F. The two sets of seats are arranged symmetrically about the axis Z of the probe but are angularly offset about this axis so that, seen in the direction of the axis, any one seat A, B or C is situated angularly between two of the seats D, E or F.

A spring 13 is disposed between the housing and the holder and exerts a bias force P, acting along the axis Z, under which the holder 10 becomes supported on the intermediate member 11 at each of the seats A, B, C and the intermediate member 11 becomes supported on the housing 12 at each of the seats D, E, F. The position attained in this way by the two movable members is referred to as the "zero position" of the holder or of the probe as the context may require.

In use the housing 12 is secured to the head, denoted H, of a co-ordinate measuring machine known per se and the holder has secured thereto a stylus 14 whereby to engage a workpiece W mounted on the table of the machine. When the head is moved to engage the stylus with the workpiece in a direction transverse to the axis Z, there is exerted on the stylus a force, e.g. Q1, causing the holder and/or the intermediate member to tilt about certain of the locations A to F. The displacing force is opposed by the force P of the spring, and when the displacing force ceases the spring restores the probe to the zero position.

As will be explained in detail later herein, the force necessary for displacing the stylus is different for different angles of this force about the axis Z. These differences are a function of the polygonal order of the seats A to F and lead to differences in the slight but unavoidable bending of the stylus under the displacing force. This means in practice that the sensitivity of the probe is not uniform in all directions about the axis Z. However, as will be shown, the provision of the six seats A to F provides a substantial improvement over the known arrangement of only three seats and is for practical purposes sufficient to avoid undue differences in said sensitivity.

Turning now to constructional details of the probe, the holder 10 comprises a disc 15 provided at each seat A, B, C of the intermediate member with a cylindrical surface 16 and the housing 12 comprises a ring-shaped flange 20 provided at each seat D, E, F with a cylindrical surface 19. The intermediate member 11 comprises a ring 21 provided at one side 11A of the member 11 with spherical surfaces 17 and at the opposite side 11B with spherical surfaces 18. The arrangement is such that any one of the surfaces 16 is engageable with a pair of adjacent surfaces 17 to support the holder on the intermediate member, and any pair of adjacent surfaces 18 are engageable with one of the surfaces 19 to support the intermediate member on the housing.

The holder and the intermediate member readily attain the zero position and become positively located therein under the force of the spring. In this connection it is to be noted that any pair of surfaces 17 engaged by the complementary surface 16 are convergent so that the surface 16 can slide into a position of engagement with both the surfaces 17. Moreover, each such pair of surfaces 17 is symmetrical with respect to a plane including the axis Z so that the surfaces 17 of the respective seats A, B, C co-operate to positively locate the holder both transversely to and rotationally in respect of the axis Z. The settling of the holder into a precise and stable location on the intermediate member is assisted by the surfaces 16,17 being convex to one another in three dimensions, i.e. in this case being respectively cylindrical and spherical. The same considerations apply to the surfaces 18 which are mutually convergent and co-operate with the complementary surfaces 19.

The surfaces 16,19 are defined by hardened and polished steel cylinders 22,23 adhered to the disc 15 and flange 20 respectively, the latter components being made of synthetic resin. The surfaces 17,18 are defined by hardened and polished steel spheres 24 adhered to the ring which is made of synthetic resin.

The holder 10 comprises an extension 10A extending from the disc 15 through openings 21A and 20A defined respectively in the ring 21 and the flange 20. This arrangement provides for an economical organization of the components. The free end of the extension 10A has a screw thread 10B for the attachment of different styli 14 as may be required for different types of work.

The ring 21 has an annular array of apertures 21A (FIG. 3) provided in alternately inclined portions 21B,21C of the ring, each aperture 21A containing one of the spheres 24. The inclined portions make it possible for the spheres to be arranged on a common pitch circle and yet be accessible to the cylinders 22,23.

Although it is preferred to provide the convergent surface pairs 17,17 and 18,18 on the ring 21, it is possible, though not as economical, to prvovide convergent surface pairs on the holder and on the housing for co-operation with complementary surfaces on the ring. Further, the spheres 24 in the ring 21 may be replaced by other circular section elements, e.g. cylinders, co-operating with spheres provided on the holder and on the housing. p In operation, the tilting action of the holder may take place in different modes depending on the direction of the displacing force about the axis Z. For the purpose of explanation of these modes it may be assumed that the resultants of forces between the surfaces 16 to 19 pass through points a to f situated on the common pitch circle 26 and each situated medially between the end of a straight line connecting the centres of two adjacent spheres 24. Further, it may be assumed that any tilting of the holder take place, at least at the instant when tilting commences, about a line passing through two of the points a to f.

Only three typical modes need be considered. In the first mode, the force Q1 (FIGS. 1 and 2) tilts the holder 10 about the line ab, contact between the surfaces 16,17 being broken at seat C. The force Q1 must be sufficient to overcome the restoring force P acting on an arm Zg. It should be noted that, on tilting, the generally downward load through points a and b has a resultant through point g and that, since point g lies inside the triangle def there is not tilting force on the intermediate member.

In the second mode, a force Q2 tends to tilt the holder about the point c but since the load through point c lies outside the triangle def, the intermediate member is tilted about the line de which is then effectively the line about which the holder tilts. The restoring force acts on an arm Zh which is the same length as the arm Zg so that the force Q2 is the same as the force Q1.

In the third mode, a force Q3 tends to tilt the holder 10 about point a but since the force Q3 acts on a line offset from point a the holder initially tends to tilt about the line ac. But since the force Q3 is closer to point a than point c the relatively greater load through point a creates a tilt about the line ef. In other words, the holder tilts simtulaneously about the lines ac and ef, the effective axis of tilt passing, at the instant tilting commences, through the intersection i of these two lines. The restoring force acts on an arm Zi which is greater than the arms Zg or Zh by a factor of about 1.16. Accordingly, and neglecting friction, the force Q3 has to be 1.16 times greater than either of the forces Q1,Q2. The factor of 1.16 is the highest likely to be encountered so that no other modes need be considered.

The factor 1.16 is considered to be within an acceptable tolerance of probe sensitivity and compares favorably with a factor 2.0 present in a probe having only one set of three seats.

Displacement of the stylus 13 from the zero position may be sensed by an electric circuit 27 which is taken through the cylinders 22,23 and spheres 24 which, as seen particularly in FIG. 3, constitute serially associated contacts. To enable the cylinders and spheres to be connected to the circuit, one of the cylinders 23 is made in mutually insulated halves 23A (FIG. 3) to which two conductors 27A,27B of the circuit are soldered. It is clear that any displacement of the stylus from the zero position must result in contact between one or other of the surfaces 16,17 and 18,19 to be broken thereby changing the state of the circuit 27 and signalling that a displacement has taken place.

The sensitivity of the probe may now be more specifically defined as the amount of bending of the stylus occuring between initial contact with the workpiece and the instant the circuit 27 is broken, i.e., the instant tilting commences. In practice, tilting will of course continue in a somewhat random manner for a short while, depending on how quickly the head of the measuring machine can be brought to a halt. But any change in the condition, e.g. any random tilting or increase in friction between the cylinders and spheres, after the circuit 27 is broken does not matter as far as the sensitivity of the probe is concerned.

I claim:

1. A probe for use in measuring apparatus comprising a first, a second and a third member, at least three first seats on the second member at one side thereof and spaced symmetrically around an axis, the first member confronting said first seats, second seats on the third member in positions spaced symmetrically around said axis and such that there is one second seat situated angularly between each adjacent two first seats, another side of said second member facing in a direction opposite to said one side and confronting said second seats, spring means for biasing the first member into engagement with said first seats and for biasing the second member into engagement with said second seats, said first member constituting a holder for a stylus and being tiltable in opposition to said spring means about any adjacent two of said first seats and, through the intermediary of said second member, about any adjacent two of said second seats.

2. Probe according to claim 1, wherein the number of said first seats is three and said second seats are positioned angularly medially between said second seats.

3. Probe according to claim 1 wherein said second and third members are ring-shaped and define respective openings, the first member being situated at the side of the second member remote from the third member and having an extension extending through said openings, and the extension having means for the attachment thereto of a stylus.

4. Probe according to claim 1 wherein said second member comprises a ring having an annular array of apertures, support elements of circular cross-section are secured to the ring in said apertures and each have portions projecting from opposite axial sides of the ring, the projecting portions at one side of the ring defining said first seats, and the projecting portions at the other side of the ring being engageable with said second seats.

5. Probe according to claim 4, wherein said circular section elements are situated in equispaced relationship on a common pitch circle, said ring is of undulating shape defining alternately inclined portions, and said apertures and elements are situated in said inclined portions.

6. Probe according to claim 1, comprising pairs of convergent surfaces on one of the first and second members and complementary surfaces on the other one of said first and second members and engageable between the convergent surfaces of respective said pairs, said surfaces on the second member constituting said first seats.

7. Probe according to claim 1, comprising pairs of convergent surfaces on one of the second and third members, and complementary surfaces on the other one of the second and third members and engageable between the convergent surfaces of respective said pairs, and said surfaces on the third member constituting said second seats.

8. Probe according to claim 1, said first member constituting electrical contacts with said seats of said second member, said second member constituting electrical contacts with said seats of said third member, and the probe comprising electrical circuit means connected to said contacts to change state when any one of said contacts is broken.

* * * * *